(12) United States Patent
Moeller

(10) Patent No.: US 12,328,567 B1
(45) Date of Patent: Jun. 10, 2025

(54) METHOD FOR DETERMINING THE HEAD-RELATED TRANSFER FUNCTION

(71) Applicant: MERCEDES-BENZ GROUP AG, Stuttgart (DE)

(72) Inventor: Rainer Moeller, Moetzingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/873,781

(22) PCT Filed: May 22, 2023

(86) PCT No.: PCT/EP2023/063631
§ 371 (c)(1),
(2) Date: Dec. 11, 2024

(87) PCT Pub. No.: WO2023/241883
PCT Pub. Date: Dec. 21, 2023

(30) Foreign Application Priority Data

Jun. 15, 2022 (DE) .................... 10 2022 002 171.4

(51) Int. Cl.
| | |
|---|---|
| H04S 7/00 | (2006.01) |
| H04N 23/21 | (2023.01) |
| H04N 23/56 | (2023.01) |
| H04N 23/90 | (2023.01) |
| H04R 1/02 | (2006.01) |
| H04R 5/02 | (2006.01) |

(52) U.S. Cl.
CPC ............ *H04S 7/303* (2013.01); *H04N 23/21* (2023.01); *H04N 23/56* (2023.01); *H04N 23/90* (2023.01); *H04R 1/025* (2013.01); *H04R 5/023* (2013.01); *H04R 2499/13* (2013.01); *H04S 2400/11* (2013.01); *H04S 2420/01* (2013.01)

(58) Field of Classification Search
USPC ....... 381/1, 17–23, 300, 302, 303, 307, 310, 381/58, 59, 61, 86, 124
See application file for complete search history.

(56) References Cited

U.S. PATENT DOCUMENTS

| | | | |
|---|---|---|---|
| 5,802,180 A | | 9/1998 | Abel et al. |
| 9,544,706 B1 * | | 1/2017 | Hirst .................. H04S 7/00 |

(Continued)

FOREIGN PATENT DOCUMENTS

| | | |
|---|---|---|
| CN | 219811336 U | 10/2023 |
| DE | 69517192 T2 | 2/2001 |

(Continued)

OTHER PUBLICATIONS

International Search Report and Written Opinion mailed Aug. 14, 2023 in related/corresponding International Application No. PCT/EP2023/063631.

(Continued)

*Primary Examiner* — Qin Zhu
(74) *Attorney, Agent, or Firm* — PATENT PORTFOLIO BUILDERS PLLC

(57) ABSTRACT

A head-related transfer function is calculated using features of the person, detected via cameras. The features are detected temporally at least partially in succession by several cameras. At least one of the cameras is arranged so that it detects the person when approaching and opening the vehicle in the area external to the vehicle.

12 Claims, 1 Drawing Sheet

(56) References Cited

U.S. PATENT DOCUMENTS

Figure 1:
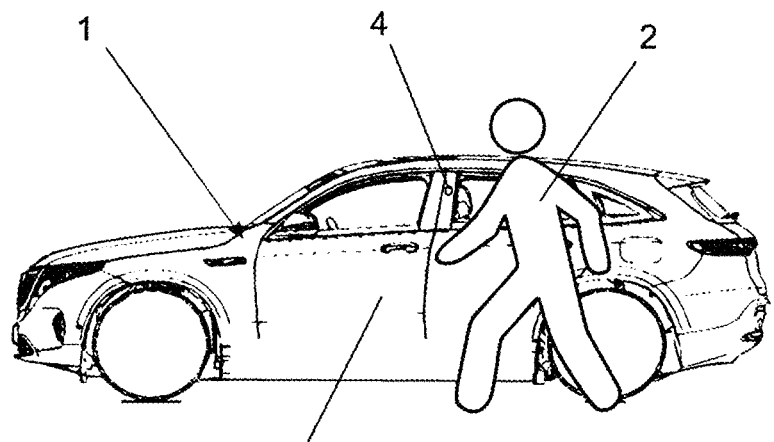

| | | | |
|---|---|---|---|
| 10,952,007 | B2 | 3/2021 | Van Laack et al. |
| 11,912,216 | B2 | 2/2024 | Hödlmoser et al. |
| 2004/0170286 | A1 | 9/2004 | Durach et al. |
| 2013/0194107 | A1* | 8/2013 | Nagata .................. G08G 1/166 340/904 |
| 2013/0272536 | A1* | 10/2013 | Tzirkel-Hancock .... H04S 7/303 381/86 |
| 2017/0251324 | A1* | 8/2017 | Stelandre ................ H04R 5/04 |
| 2019/0042844 | A1* | 2/2019 | Paradiso ................ H04N 7/185 |
| 2020/0204940 | A1* | 6/2020 | Kim .................... G10L 21/0232 |

FOREIGN PATENT DOCUMENTS

| | | |
|---|---|---|
| DE | 10308414 B4 | 9/2004 |
| DE | 102014210105 A1 | 12/2015 |
| DE | 102018209962 A1 | 12/2019 |
| DE | 102020108449 A1 | 9/2021 |
| DE | 102020132427 A1 | 6/2022 |
| JP | 2010067020 A | 3/2010 |
| JP | 2020170938 A | 10/2020 |
| WO | 2021175516 A1 | 9/2021 |

OTHER PUBLICATIONS

Office Action created Apr. 6, 2023 in related/corresponding DE Application No. 10 2022 002 171.4.
Office Action dated Mar. 4, 2025 in related/corresponding CN Application No. 202380039034.9.

* cited by examiner

1

METHOD FOR DETERMINING THE HEAD-RELATED TRANSFER FUNCTION

BACKGROUND AND SUMMARY OF THE INVENTION

Exemplary embodiments of the invention relate to a method for determining the head-related or outer ear-related transfer function, as well as to a method for outputting audio data considering a determined head-related transfer function of such type.

The so-called head-related or also outer ear-related transfer function is frequently also referred to with the abbreviation HRTF, which aligns with the English language term head-related transfer function, which has also found its way into other languages as a technical term. The HRTF describes the transfer function of the outer ear and, along with the transit time differences between the two ears of a person, is essential for the localization of sound sources. Due to the different anatomy of each person, the HRTF function is individual for each person. Relevant factors here are above all the shape of the head, which has an influence on the sound diffraction on the head and the distance between the ears, as well as the individual shape of the auricles and the ear canal. If the HRTF of a person is known, then it is possible to virtually position sound sources in space in order to achieve localization of the sound source at a virtually specified position in space. This functionality is frequently referred to with the term 3D audio.

In many use cases, however, nine or more loudspeakers are required for this. However, if the HRTF of a person is known, such a 3D audio effect can be created virtually using only two loudspeakers arranged in a right and left region in relation to the person. In the field of general audio engineering, complex measurements of test signals using miniature microphones in each auditory canal are known fundamentally for detecting the HRTF.

It can be simpler and more efficient if a visual detection of the anatomy or geometry of the head, auricles and their spatial relationship to each other is provided. In this context, DE 10 2020 108 449 A1 describes a method for providing at least one user-specific binaural sound signal for vehicle occupants, in which method the user-specific HRTF is calculated based on the anatomy of the respective person. The anatomy of the respective person is detected in this case by interior cameras arranged in the vehicle in order to simply and comfortably provide an optimized audio experience by means of a large number of loudspeakers.

US 2013/0194107 A1 similarly describes the detection and storage of an HRTF in order to create a virtual 3D audio effect via a signal processor. Here as well, cameras are used for detecting the anatomy on which the calculations are based.

Detection of the entire relevant anatomy via cameras installed in a vehicle, for example cameras installed in the front area in front of a person using the vehicle, is extremely difficult in practice, since frequently not all relevant areas of the head of the corresponding person can be reliably detected with sufficient accuracy via these cameras. The person can be prompted to move and turn their head in front of the cameras accordingly, but this is comparatively time-consuming in practice and is considered as a loss in comfort if it is required every time the 3D audio is started.

Exemplary embodiments of the present invention are therefore directed to an improved method for determining the head-related transfer function for at least one person using a vehicle, as well as to an improved method for outputting audio data.

The method according to the invention for determining the HRTF for at least one person using a vehicle detects features of the person via cameras, in particular anatomical features of the head and the ears, in order to calculate the HRTF therefrom in a manner known per se. According to the invention, it is provided that the features are detected temporally at least partially in succession by several cameras, wherein at least one of the cameras is arranged so that it detects the person when approaching and opening the vehicle in the area external to the vehicle.

The method according to the invention therefore makes it possible to detect a person in the area external to the vehicle even when they are approaching and boarding the vehicle. Thus, an initial base of features for determining the HRTF is available well before starting the vehicle. Due to the fact that at this time the person is located outside, i.e., in the external surroundings of the vehicle, very good images for analyzing the corresponding anatomical features can be detected via the cameras. Preferably, the camera can take several images in succession, as the person approaches the vehicle and opens or boards said vehicle. Thus, the person can be detected at different angles and typically under different lighting conditions, with different shadows. This data can be processed accordingly and form a valuable initial foundation in order to form as precise a model as possible of the ears and the parts of the head relevant for HRTF or also the entire head based on the camera data.

In principle, a camera can be used for this purpose in the interior of the vehicle, which looks outwards through the window. This has the advantage that it protects the camera from vandalism. However, it is particularly favorable to use an external camera provided in the area external to the vehicle. This can be in particular a camera that is arranged specifically for this purpose or particularly preferably a camera that is already present. For example, a camera can be used which is otherwise used for facial recognition of a person approaching, in order to ensure access to the vehicle based on the recognized face or other biometric features.

The camera used here can, in particular, be arranged in the region of the B pillar. Additionally or alternatively, it is also conceivable to use a camera in the region of the A pillar or also a camera arranged in the region of the rear-view mirror. In particular, if an actual rear-view mirror is dispensed with, and this rear-view mirror is replaced with a camera, the camera can also be used. If several cameras are installed in the area external to the vehicle anyway, images can be generated by different cameras as well in order to increase the possible selection of lighting conditions, viewing angles of the relevant anatomical features of the person, and similar.

A further extraordinary favorable embodiment of the method according to the invention also provides that additional cameras detect features of the person inside the vehicle. In particular, the interior cameras of the vehicle, which are frequently available anyway, can be used for this purpose. This can be a central camera in an overhead control panel, for example, or it can be cameras which are otherwise also used for detecting the viewing direction, for detecting gestures, for monitoring the alertness of a person driving the vehicle, or similar.

In particular, it can be provided according to an extraordinarily favorable further development of the method according to the invention that, for example, beginning with an opening of the door and the person subsequently boarding the vehicle, a camera in an instrument panel of the vehicle is used for detecting a first side of the head when boarding the vehicle, and a camera in a central overhead control panel, arranged between the seats, is used for detecting the second side of the head when or after boarding the vehicle. In a vehicle with left-hand drive, for example, such a camera could, for example, initially detect the left side of the head when the driver boards the vehicle and could subsequently then detect the right side of the head with the central camera which in particular is integrated in the overhead control panel. The data can then be combined with a front view of the person, detected after completing boarding via the camera in the instrument panel, and the images from the exterior of the vehicle, already detected before boarding, in order to carry out ideal modelling of the head or the areas of the head and ears relevant for the HRTF. On this basis, the HRTF can be simply and efficiently calculated and can be stored accordingly, in order for it to be accessed directly when a person is recognized by facial recognition or else a person is recognized by a personalized key, a personalized smartphone, a smartwatch or similar, if playback of 3D audio data in the vehicle is desired.

The earlier detection in the area external to the vehicle also makes it possible in each case to efficiently detect the person there so that it can be determined by a comparison with data that is already stored whether the anatomy of the person has changed, which typically occurs over time, or not. If the anatomy has not changed, the detection of further features for the recalculation of the HRTF can be dispensed with. If the anatomy in the areas relevant for the HRTF has changed accordingly, then the detection in the steps described above can take place in order to recalculate the HRTF.

According to a further very favorable embodiment of the method according to the invention, it can be provided that the head of the person is illuminated with near-infrared light during the detection, and this also applies for the detection in the area external to the vehicle. This enables efficient detection of the relevant features of the corresponding person, even in bad viewing conditions, for example at dusk or in the dark, so that the features required for the HRTF can be detected efficiently and the function can be calculated reliably.

If the system sees a need for further data after the person has boarded, since not all viewing angles have been correctly detected, in particular when it is the first time the person has boarded the vehicle, then according to the method, when needed, the person can be prompted after boarding to turn their head from one side to the other, in order to further improve the detection of the features for calculating the HRTF.

Advantageously, the audio system installed in vehicles can be improved with the method. For this purpose, the data obtained with the HRTF is transferred in real-time via the Ethernet into the central audio amplifier, for example. There, the audio signal is processed accordingly via an algorithm in the DSP (digital sound processor) tailored to the vehicle cab and output via a cable to the loudspeakers in the vehicle seat.

Advantageously, several loudspeakers can be controlled in the vehicle.

If the HRTF of a person is known, it is possible to virtually position sound sources in space. For this purpose, the signal is convolved using the HRIR (head-related impulse response), known from the prior art, of the corresponding sound incidence direction and thus localization from this direction is created.

3D audio is the future, but it requires 9 or more loudspeakers. If the HRTF of a person is known, 3D audio can be created virtually using only two loudspeakers.

Therefore, a sound impression which sounds like 9 loudspeakers can be created using two loudspeakers.

As already explained in the introduction, a virtual 3D audio effect can be created with an HRTF calculated based on the features detected in this way in order to ensure an optimum 3D audio experience for the person in the vehicle. In order to implement this with low effort with regard to the hardware, it can be provided with the method according to the invention for outputting audio data that the output of the audio data takes place via a sound processor based on the calculated HRTF for the respective person, wherein two loudspeakers integrated into the vehicle seat of the respective person are used in the vehicle. Differently to the methods in the aforementioned prior art, the method uses only two loudspeakers per person in order to realize virtual 3D audio. These loudspeakers are integrated into the vehicle seat of the respective person. According to a particularly favorable embodiment, they are arranged in the seat back at about shoulder height of an average-sized person. Ideally, they are connected to the sound processor via cables in order to emit the virtual 3D audio generated by the sound processor in real time and without latencies which may occur in the case of a radio connection, and to provide an optimum audio experience to the corresponding person based on their individual HRTF.

Further advantageous embodiments of the method according to the invention result from the exemplary embodiment which is described in more detail below with reference to the figures.

BRIEF DESCRIPTION OF THE DRAWING FIGURE

Figure 2:
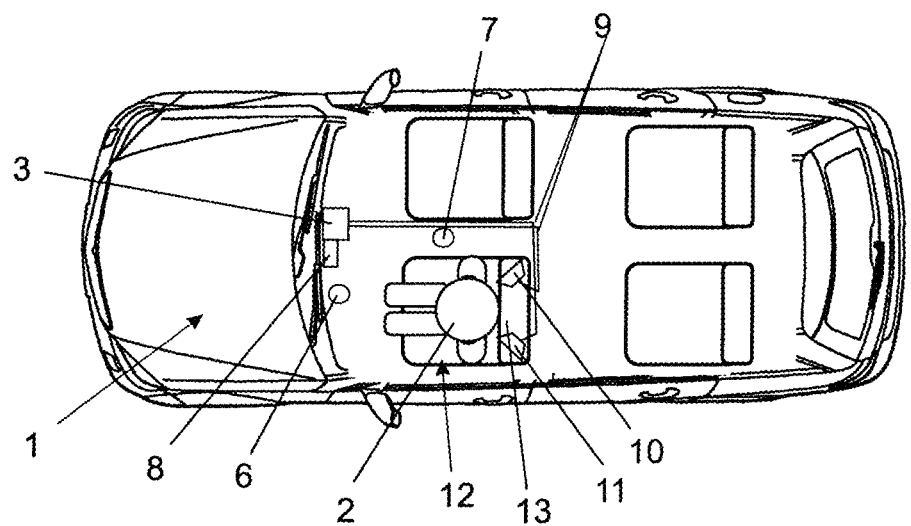

Here:
FIG. 1 shows a schematic side view of a vehicle which a person is approaching;
FIG. 2 shows a plan view of a vehicle with a view into the vehicle interior and a person indicated in the interior.

DETAILED DESCRIPTION

A signal source, such as a piece of music for example, is not directed directly into the inner ear when listening to music in a vehicle 1, indicated in FIGS. 1 and 2, but undergoes different reflection patterns on the body, the head and auricles, depending on the sound incidence direction. Superimposing the direct sound and the reflections results in interferences that the human brain can interpret as signal direction. The so-called head-related transfer function, which is occasionally also referred to as outer ear-related transfer function, describes exactly this transfer from the region of the outer ear into the ear canal. It is typically referred to as HRTF, which is based on the English term head-related transfer function. This transfer function, together with the transit time differences between the two ears, is largely responsible for the localization of sound sources by the corresponding person 2, which is represented accordingly in FIGS. 1 and 2. Due to the different anatomy of each individual person, the HRTF is individual for each person. The individual head shape, which has an influence on the sound diffraction on the head and influences the distance between the ears, is relevant in this case. Furthermore, the individual shape of the auricles and of the ear canal plays a role.

In order to enable a high-quality 3D audio experience having a virtual positioning of the sound sources in space with simple means, it is crucial that the individual HRTF of the respective person 2 is known. Then the audio signal can be convolved according to the incidence direction by means of the so-called head-related impulse response (HRIR), and thus a localization can be created from this direction. A digital sound processor (DSP) 3 represented in FIG. 2 enables the creation of a 3D audio sound for the respective person 2.

In order to be able to simply and efficiently detect the individual HRTF for the respective person 2, as is indicated in the representation of FIG. 1, the face or head of the person is detected using a first camera 4 in the so-called B pillar of the vehicle 1, in the event that the person 2 approaches the vehicle 1 in order to open it. This camera 4 is often available in any case in order to unlock the vehicle 1 for authorized persons via facial recognition, for example. Initial data can be collected via this camera at different viewing angles of the head of the person 2 and with different lighting conditions, on the one hand in order to realize facial recognition and on the other hand to define coordinates of facial features, such as eyes, nose, mouth, ears and head shape via image analysis methods and mathematical calculations. Preferably, the data detection takes place via near-infrared light, which is reflected by the face in order to ensure adequate facial recognition under all lighting conditions. Initial data for calculating the individual HRTF is therefore also available with this initial first data set.

When opening the vehicle door 5, here for example the driver's door, and during the subsequent boarding, a second camera 6, arranged in an instrument cluster of the vehicle 1 and which can be seen in the representation of FIG. 2, then detects the anatomy of the left side of the head of the person 2 during boarding. The system for calculating the HRTF thus obtains a further data set. Anatomical data of the right side of the head can be detected via another camera 7 in an overhead control panel that is typically arranged in the headliner of the vehicle, i.e., its roof area. The second camera 6 subsequently optionally detects the head or the face of the person 2 from the front in order to generate additional data.

Now, if it is queried via an audio system of the vehicle whether a personalized high-end sound is to be activated and if this is accordingly confirmed, then a 3D audio signal is output that is specially generated based on the individual features of the passenger compartment which do not change and on the individual HRTF for the respective person 2. If the data available at this time is not yet sufficient for determining a reliable individual HRTF, then a media system of the vehicle can also prompt the person 2 to turn their head again slowly from left to right. As a result, additional data can be detected via the two cameras 6, 7 in the interior of the vehicle and be compared with the data already detected or used for supplementing said data. The data detected in this way is then ideally transferred in real time over a vehicle-internal Ethernet into a central audio amplifier 8 in order to be edited or processed there accordingly by an algorithm tailored to the passenger compartment. The audio signal is then preferably transferred to loudspeakers 10, 11, connected via cable 9, via the aforementioned DSP 3. These loudspeakers are integrated into the vehicle seat 12 of the person 2 and here in particular into the seat back 13 thereof, at about shoulder height of an average-sized person. A virtual 3D sound world can therefore be created via only two loudspeakers 9, 10 of such type at shoulder height in the seat back 13, which results in a unique listening experience.

Without using the corresponding algorithms and HRTF, the loudspeakers 10, 11 could also be used for simple stereo playback, which would be experienced by the person 2 as though it were coming from behind.

The anatomy of the person 2 approaching the vehicle can be detected each time automatically via the first camera 4 in the B pillar of the vehicle 1 when the person is approaching or boarding and can be compared with the stored data. Since the anatomy of people and thus their HRTF can change over time, readjustment can take place on this basis. Furthermore, the whole system can be provided with updates, in particular with over-the-air updates, should an improved algorithm become available at a later time. Then, for all or also only for some selected persons 2, the personalized high-end sound can be activated via the media system of the vehicle 1 so that the 3D audio is always used when these persons 2 are detected in the vehicle, for example using facial recognition or also using individualized vehicle keys, smartphones, smart watches and similar, which are registered accordingly to the vehicle 1 and are linked to the persons. Thus, there is also the possibility of enabling the high-end sound only for specific persons 2 and of blocking it accordingly for other persons using the vehicle 1, for example.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining a head-related transfer function for a person using a vehicle, the method comprising:
   detecting features of the person via a plurality of cameras, wherein the features are detected temporally at least partially in succession by the plurality of cameras, wherein at least one of the plurality of cameras is arranged so that the at least one of the plurality of cameras detects the person when approaching and opening the vehicle in an area external to the vehicle; and
   calculating the head-related transfer function using the features of the person detected via the plurality of cameras.

2. The method of claim 1, wherein the at least one of the plurality of cameras is an external camera of the vehicle that detects the person in the area external to the vehicle.

3. The method of claim 2, wherein the external camera is arranged in a region of a B pillar, A pillar, or a rear-view mirror of the vehicle, wherein the rear-view mirror can also be the external camera.

4. The method of claim 1, wherein the plurality of cameras include additional cameras detecting features of the person inside the vehicle.

5. The method of claim 4, wherein the plurality of cameras comprise:
 a camera in an instrument panel for detecting a first side of a head of the person when the person is boarding the vehicle; and
 a camera in a central overhead control panel, arranged between seats, for detecting a second side of the head of the person when or after the person boards the vehicle.

6. The method of claim 1, wherein a head of the person is illuminated with near-infrared light during the detecting features of the person.

7. The method of claim 1, wherein the detected features of the person and the calculated head-related transfer function for the person is stored for the person, and features newly detected and are compared with the stored features when the vehicle is used again by the person, wherein the head-related transfer function is adapted when the comparison indicates a change in the detected features.

8. The method of claim 1, wherein when required, the person is prompted after boarding the vehicle to turn the person's head from one side to another side, wherein images are captured to improve the detecting of the features for calculating the head-related transfer function.

9. The method of claim 1, wherein a digital sound processor is controlled with the calculated head-related transfer function and an audio signal is adapted accordingly.

10. The method of claim 9, wherein at least two loudspeakers are controlled with the audio signal.

11. A method for outputting 3D audio data via a sound processor based on the head-related transfer function calculated according to claim 1, wherein exactly two loudspeakers integrated into a vehicle seat the respective person are used as a sound source.

12. The method of claim 11, wherein the exactly two loudspeakers are integrated into a seat back of the vehicle seat at shoulder height of an average-sized person.

* * * * *